United States Patent Office 3,036,411
Patented May 29, 1962

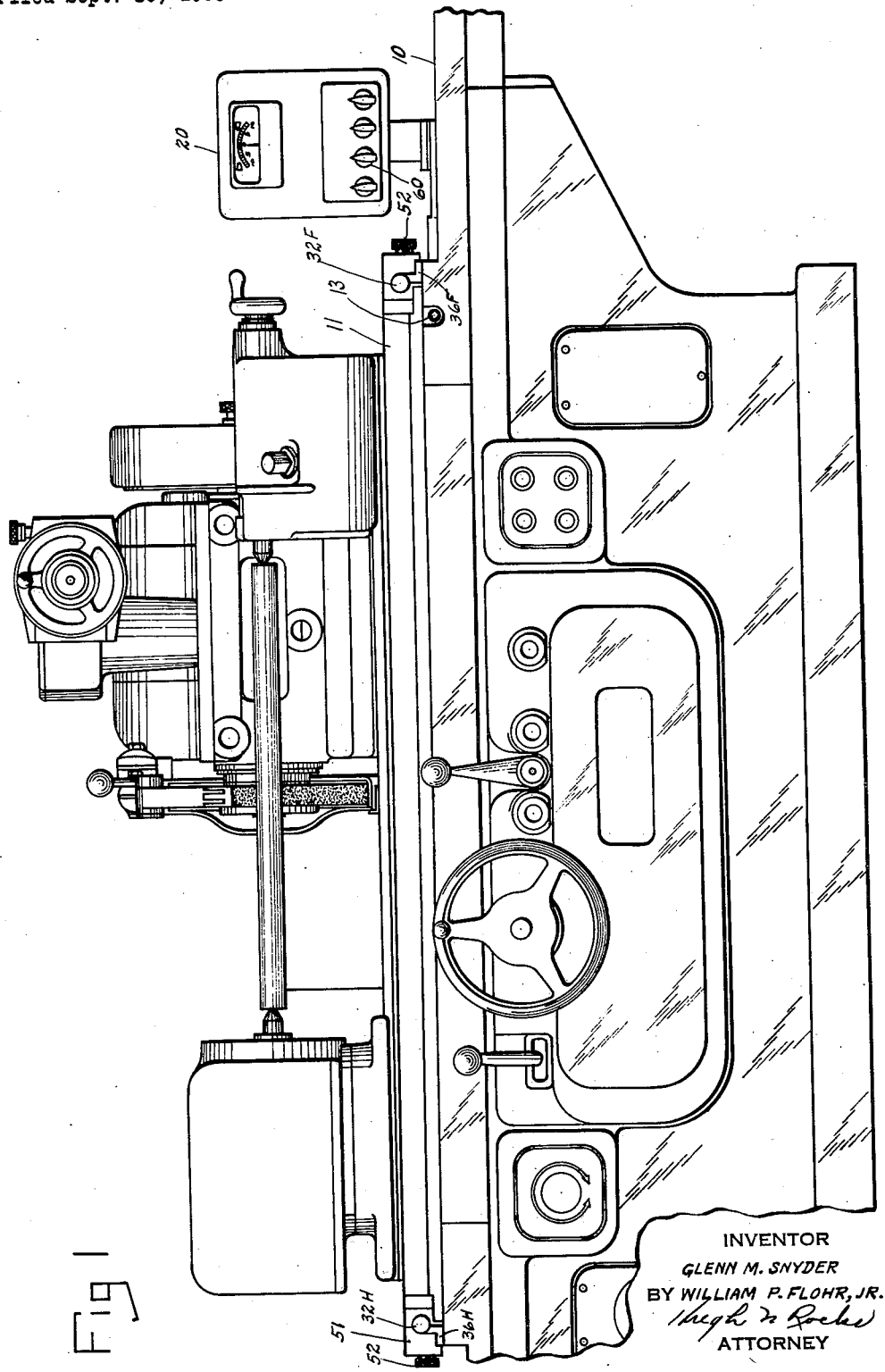

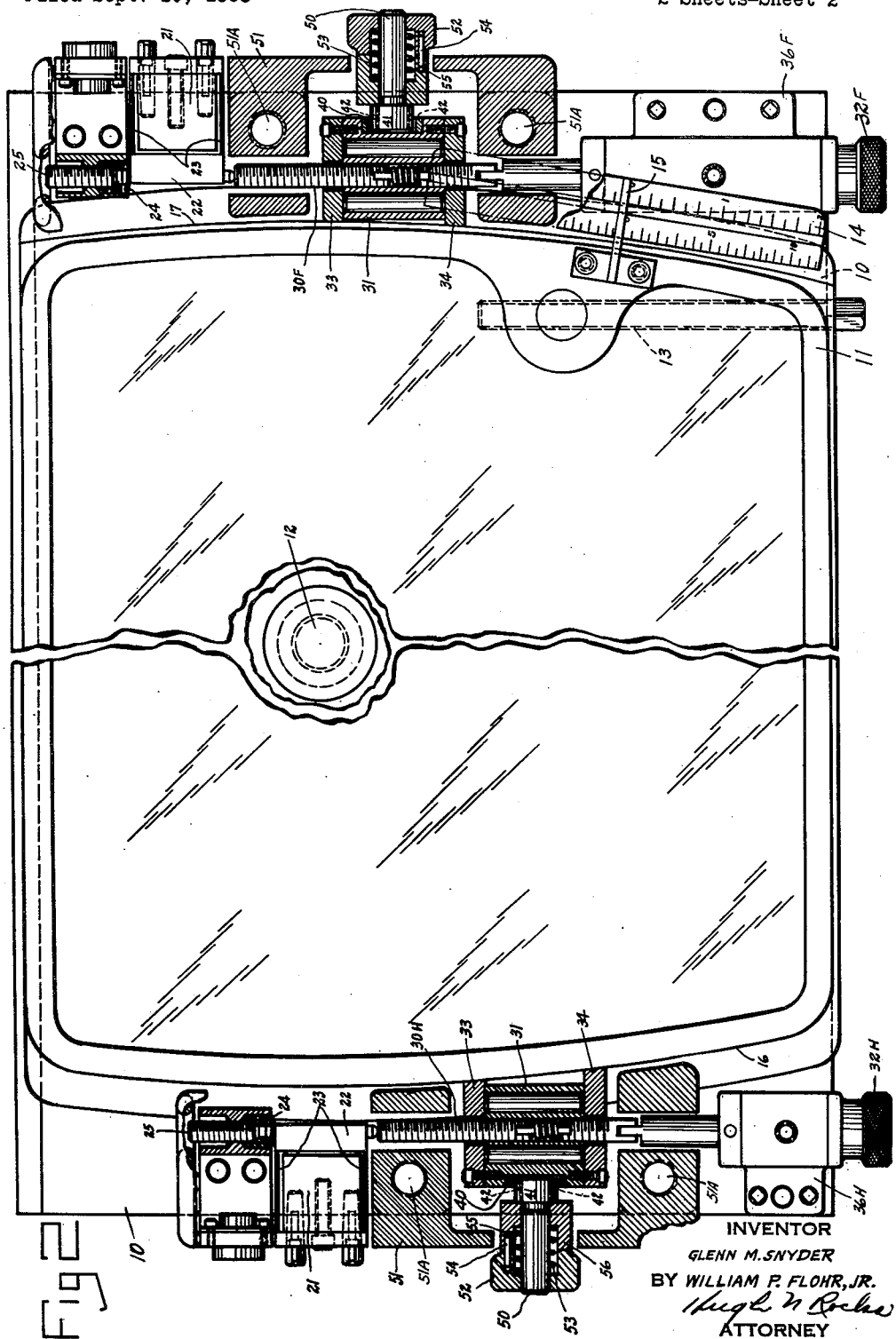

3,036,411
PRECISION MEANS FOR POSITIONING
MACHINE TOOL ELEMENTS
Glenn M. Snyder and William P. Flohr, Jr., Waynesboro, Pa., assignors to Landis Tool Company, Waynesboro, Pa.
Filed Sept. 15, 1958, Ser. No. 761,016
8 Claims. (Cl. 51—165)

This invention relates to means for effecting quick engagement and disengagement between an adjustable machine element and a precision positioning or locating device.

In a grinding machine, which is used in this case for illustrative purposes, the swivel table is pivotally mounted on a work carriage for angular adjustment in a horizontal plane. When the screw is actuated to adjust the swivel table at a predetermined position on the scale, there is no assurance that the other end of the table will move the same distance because of friction between the table and the carriage and the resulting deflection of the table due to the forces required to overcome friction.

It is an object of this invention to provide means for adjusting a swivel table whereby both ends of the swivel table will be moved the same angular distance for any given adjustment.

Another object is to provide means whereby the swivel table may be moved accurately by a predetermined amount or to a predetermined position.

Devices used for making precision adjustments of machine parts are usually operable only through a very limited range. In indexing a machine element over a wide range for changing one position of adjustment to another remotely located position of adjustment, it is necessary to unclamp the precision device from one position and mount it again in a new position.

Another object, therefore, is to provide means whereby a pick-up device, which is operable only within a small range, is used for the complete range of adjustment of the swivel table without having to remove the pick-up and transfer it to a new position.

This invention consists of a pick-up device in each end of a carriage having an actuator magnetically attached to the table so that the member may swivel with the table through a short range to actuate the pick-up, or it may be held stationary while the table is swivelled to widely spaced positions. Such a device may be used also for linear positioning. A short movement of the table within the range of the indicator is transmitted to the indicator through the magnet and the actuator mounted therein.

When it is desired to set the swivel table in an entirely different position, the swivel table may be moved to an approximate position according to the conventional scale, and since the table may be swivelled to another position while the magnet is held against movement, the indicator is immediately ready to function in the new position with no attention from the operator than to center the actuating member in the operating range of the indicator in the new position. This is done by turning a centering knob.

In order to adjust the table to a predetermined taper, a rough adjustment is made by means of the swivel adjusting screw and a conventional taper scale, and the table is clamped in this position. A workpiece is then ground from end to end and the diameter measured at predetermined spaced points in the order of 1, 2, 4, 8, etc. inches depending on the length of the piece, with the longest possible space being used. A piece 4"–7" long would be measured at points 4" apart. A piece 8" – 15" long would be measured at points 8" apart. The indicator apparatus, which is a commercial item, is then set for the selected spacing. The actuators are then centered and the actuator adjusting screw in the footstock end of the carriage is turned until the indicator, which is set for the footstock end, shows the difference in diameter between the two points in the direction corresponding to the direction of taper. If the workpiece is .0002 large at the footstock end, the adjusting screw is turned to cause the indicator to move to the side showing a piece large at the footstock end.

The indicator is then set for the headstock position. The actuator adjusting screw on the headstock end is adjusted until the indicator again shows the difference in diameter between the two measured positions and in the direction from zero corresponding to the direction of taper as shown by the taper symbol above each end of the scale. The table clamps are then released. The swivel table is adjusted by means of the conventional adjusting screw to a point indicated by the meter beyond the zero point by one graduation. The table adjusting screw is then turned in the opposite direction until the meter passes beyond the zero point by ½ graduation. The screw is again reversed until the indicator is on zero. The headstock end is then in zero position and the clamp at that end of the table is secured. The selector switch is then turned to the footstock position and the swivel table adjusted by the adjusting screw in the same manner as described above until the indicator finally reads zero. The machine is then ready to grind a straight workpiece.

If it is desired to grind a taper workpiece, the table will be set roughly to the desired taper. A workpiece will be ground from end to end and measured to determine the variation, if any, from the desired taper. On the indicator, the desired position would then be zero.

Because of the elasticity of the table, after the headstock has been set to zero, the indicator, when set in the footstock position, will show that that end of the table has moved beyond the zero point. When the adjusting screw is reversed, the deflection of the footstock end of the table is relieved and the adjustment continued until the meter reads zero.

FIGURE 1 is a front elevation of a plain cylindrical grinding machine.

FIGURE 2 is a plan view of a swivel table with the pick-up assembly in section.

Numeral 10 indicates the work carriage of a grinding machine. 11 is a swivel table slidably mounted on carriage 10 for angular adjustment about center 12. A conventional adjusting screw 13, suitably connected to swivel table 11, serves to move said table 11 angularly about its center 12. A graduated scale 14 mounted on carriage 10 and an indicating arm 15 mounted on table 11, show the angular position of swivel table 11.

The means for effecting a precise angular adjustment of table 11 consists of a suitable electrically-operated indicator 20 and a transducer pick-up 21 mounted in fixed position on carriage 10. Transducer 21 includes an actuating member 22 supported in operative position by parallel springs 23. Actuating member 22 is urged by spring 24 into engagement with the means for transmitting the movement of swivel table 11 to transducer 21. A stop screw 25 prevents damage to springs 23 by limiting movement of transducer 21.

The means for actuating said transducer 21 consists of adjusting screws, 30H at the headstock end and 30F at the footstock end, one end of which is threaded into magnets 31 and having knobs 32H and 32F. The other end of said adjusting screws 30H and 30F are rotatably supported in brackets 36H and 36F on carriage 10. Magnets 31 have polepieces 33 and 34 shaped to conform to the end surface of swivel table 11. One side of the magnets 31 has a notch 40 to receive a centering member consisting of a cylindrical head 41 and having a pair of hardened contact members 42 set into head 41 and protruding beyond the peripheral surface of head 41. Head 41 has a shank member 50 extending through housing 51 and supported in bracket 56 which is attached to carriage 10. Housing 51 is secured to carriage 10 by means of screws (not shown) through holes 51A in said housing. A portion of said housing extends over the ledge on the end of table 11 so that when housing 51 is secured to carriage 10, it also serves to clamp table 11 to carriage 10. A knob 52 is attached to the outer end of shank member 50. A spring 53 urges knob 52 into a position determined by pin 54 in knob 52 and notch 55 in bracket 56. In this position, the hardened contact members 42 are out of contact with the surfaces of notch 40.

Operation

Swivel table 11 is first positioned by means of adjusting screw 13 to the zero position or to any desired position on scale 14. A workpiece is then placed in the machine, ground and measured. We will assume that it shows .0003" larger at the footstock end than at the headstock end. It may also be assumed that table 11 was moved into zero position from some other position. In which case, magnet 31 would have moved with table 11 a short distance until notch 40 engaged head 41. Thereafter, magnet 31 would have remained stationary while table 11 would have moved to the desired position. Magnet 31 would then have attached itself and adjusting screw 30H to the headstock end surface 16 of table 11. The footstock end surface 17 of table 11 is similar to said headstock end, and the swivel adjusting means on said footstock end of table 11 is the same as on the headstock end.

Magnet 31 is then centered by turning knob 52 until members 42 engage the opposite sides of notch 40. Knob 52 is then released and spring 53 turns knob 52 in the opposite direction until pin 54 engages one end of notch 55. This centering of magnet 31 assures that it will always be in the same position relative to transducer 21 when a precision adjustment is to be made.

Adjusting screws 30H and 30F at opposite ends of carriage 10 are turned separately to adjust indicator 20 so that when it is connected to the footstock end by one contact of selector switch 60 or to the headstock end by another contact of switch 60, it reads .0003" larger on the footstock end. Adjusting screw 13 is then turned until indicator 20 shows zero at the headstock end surface 16 of table 11. The headstock end surface 16 is then clamped firmly to carriage 10. Indicator 20 is connected to the footstock end surface 17 of table 11 by means of selector switch 60 and will show that due to deflection, the footstock end surface 17 has been adjusted to a point beyond the desired position. Adjusting screw 13 is then reversed until indicator 20 shows that the footstock end surface 17 of table 11 is in the exact desired position by indicating zero. The footstock end surface 17 is then clamped to carriage 10.

It is to be understood that while this invention is illustrated in connection with the angular adjustment of a machine tool table, it is by no means limited to that application. Any machine which requires precise location of two relatively moving parts may use this device to permit the parts to move quickly from one position to another and then to effect a precise locating movement to the exact desired position.

We claim:

1. In a grinding machine, a work carriage, a work table mounted for angular adjustment on said work carriage, means for effecting said angular adjustment including an adjusting screw, an electrical indicating device for indicating the extent of movement of each end of said work table, connections between said work table and said indicating device including an electrical pick-up member on each end of said work carriage, means movable with said work table for actuating said pick-up member including a magnet adapted to adhere to the end surface of said work table, a longitudinally adjustable member in said magnet for engaging said pick-up member, and means on said carriage to limit the extent of movement of said magnet and said actuating means with said work table.

2. In a grinding machine, a work carriage, a work table mounted for angular adjustment on said work carriage, means for effecting said angular adjustment including an adjusting screw, an indicating device for indicating the extent of movement of each end of said work table, connections between said work table and said indicating device including an electrical pick-up member on each end of said work carriage, means movable with said work table for actuating said pick-up member including a magnet adjustably connected to said actuating device for attaching said actuating device to said work table, said magnet being adapted to adhere to the end surface of said work table, means on said carriage to limit the extent of movement of said magnet with said work table, the relation between said work table and said magnet being such that said work table may continue to move while said magnet remains stationary, and means to effect an endwise centering adjustment of said magnet relative to said work table after each change in angular position of said work table.

3. In a grinding machine, a work carriage, a work table mounted for angular adjustment on said work carriage, means for effecting said angular adjustment including an adjusting screw, an indicating device for indicating the extent of movement of each end of said work table, connections between said work table and said indicating device including an electrical pick-up member on each end of said work carriage, means movable with said work table for actuating said pick-up member including a magnet adapted to adhere to the end surface of said work table, an axially adjustable member in said magnet for engaging said pick-up member, and means to limit the extent of movement of said magnet with said work table including a slot in said magnet, means mounted on said carriage and extending into said slot, said means comprising a rotatable cam, and means for rotating said cam to shift said magnet to center said magnet relative to said pick-up member.

4. In a grinding machine, a work carriage, a work table mounted for angular adjustment on said work carriage, means for determining the extent of said adjustment comprising an electrical indicator gauge, a pick-up device for actuating said gauge, means for engaging and actuating said pick-up device and means for slidably attaching said actuating means to said work table including a magnet.

5. In a grinding machine, a work carriage, a work table mounted for angular adjustment on said work carriage, means for effecting said adjustment comprising gauge actuating members magnetically and adjustably attached to each end of said work table, means for effecting said angular adjustment including an adjusting screw, means for indicating the extent of movement of each end of said table, the adjustment being continued until the end of the table opposite the adjusting screw indicates zero, means for clamping the table to the carriage in this position while the end of the table adjacent said adjusting screw has moved past the zero point, said adjusting screw being reversed to relieve the deflection of the table and cause that end of the table to return to zero position.

6. In a machine having parts movable relative to one another, means for precisely locating one of said parts relative to the other in different positions including means for indicating extent of movement between said parts, actuating means for said indicating means including a magnet for releasably and slidably attaching said actuating means to one of said parts.

7. In a machine having parts movable relative to one another, an actuating member movable with a movable member, means for changing the zone of movement of said movable member while maintaining a fixed zone of movement of said actuating member comprising a magnet on said actuating member for magnetically and slidably attaching said actuating member to said movable member.

8. In a machine having parts movable relative to one another, means for precisely locating one of said parts relative to the other in different positions including indicating means on one of said parts for indicating the extent of movement between said parts, means on the other of said parts for actuating said indicating means, and a magnet on one of said indicating and actuating means for releasably and slidably attaching one of said indicating and actuating means to one of said parts.

References Cited in the file of this patent

UNITED STATES PATENTS

| | | |
|---|---|---|
| 465,478 | Johnston | Dec. 22, 1891 |
| 1,693,723 | Mitchell | Dec. 4, 1928 |
| 2,600,550 | Levesque | June 17, 1952 |
| 2,627,119 | Graham | Feb. 3, 1953 |
| 2,780,040 | Goehring | Feb. 5, 1957 |
| 2,880,407 | Comstock | Mar. 31, 1959 |